(12) United States Patent
Vuppaladhadiam (10) Patent No.: US 11,196,870 B2
(45) Date of Patent: Dec. 7, 2021

(54) METHOD, SYSTEM, AND DEVICE FOR CLOUD VOICE QUALITY MONITORING

(71) Applicant: Mitel Cloud Services, Inc., Mesa, AZ (US)

(72) Inventor: Harikrishna Vuppaladhadiam, Fremont, CA (US)

(73) Assignee: Mitel Clouds Services, Inc.

( * ) Notice: Subject to any disclaimer, the term of this patent is extended or adjusted under 35 U.S.C. 154(b) by 125 days.

(21) Appl. No.: 16/585,530

(22) Filed: Sep. 27, 2019

(65) Prior Publication Data
US 2021/0099579 A1    Apr. 1, 2021

(51) Int. Cl.
| | | |
|---|---|---|
| H04L 29/06 | (2006.01) |
| H04M 3/22 | (2006.01) |
| H04L 12/26 | (2006.01) |
| H04M 7/00 | (2006.01) |
| G06F 11/07 | (2006.01) |
| G10L 25/69 | (2013.01) |
| H04M 3/436 | (2006.01) |
| H04M 7/12 | (2006.01) |

(52) U.S. Cl.
CPC ......... *H04M 7/0084* (2013.01); *G06F 11/079* (2013.01); *G10L 25/69* (2013.01); *H04L 43/0829* (2013.01); *H04L 43/0852* (2013.01); *H04M 3/2227* (2013.01); *H04M 3/436* (2013.01); *H04M 7/1275* (2013.01)

(58) Field of Classification Search
None
See application file for complete search history.

(56) References Cited

U.S. PATENT DOCUMENTS

| | | | | |
|---|---|---|---|---|
| 7,852,784 | B2 * | 12/2010 | Leung ................ | H04L 41/5087 370/252 |
| 8,165,109 | B2 * | 4/2012 | King .................... | H04L 65/608 370/352 |
| 8,248,953 | B2 * | 8/2012 | Kumar .................. | H04B 3/46 370/242 |
| 8,559,320 | B2 * | 10/2013 | Khanduri ............ | H04L 41/5087 370/252 |
| 2004/0160896 | A1 | 8/2004 | Luna et al. | |
| 2006/0153174 | A1 * | 7/2006 | Towns-von Stauber ..................... | H04L 65/80 370/356 |
| 2006/0221942 | A1 | 10/2006 | Fruth et al. | |
| 2007/0248022 | A1 * | 10/2007 | Kumar ................ | H04L 41/5009 370/252 |
| 2007/0286351 | A1 * | 12/2007 | Ethier .................... | H04L 65/80 379/32.01 |
| 2008/0049738 | A1 * | 2/2008 | Joung .................... | H04L 43/12 370/356 |

(Continued)

*Primary Examiner* — Ajit Patel (57) ABSTRACT

Systems and methods for communications are disclosed. The systems and methods can monitor a cloud-based voice over internet protocol (VoIP) calling system to determine an active call. The systems and methods can also analyze the active call to determine an indication of call quality, the analyzing occurring during the active call. Additionally, the systems and methods can compare the indication of call quality to a quality threshold. The compare can occur during the active call to determine when the active call has a poor call quality. The systems and methods can also report the poor call quality based on the comparing the indication of call quality to the quality threshold.

17 Claims, 6 Drawing Sheets

(56) References Cited

U.S. PATENT DOCUMENTS

| | | | |
|---|---|---|---|
| 2008/0175228 A1* | 7/2008 | Chang | H04L 65/1056 |
| | | | 370/352 |
| 2011/0141925 A1* | 6/2011 | Velenko | H04L 67/104 |
| | | | 370/252 |
| 2014/0229614 A1* | 8/2014 | Aggarwal | H04M 3/2236 |
| | | | 709/224 |
| 2014/0317288 A1* | 10/2014 | Krueger | H04L 43/08 |
| | | | 709/224 |
| 2016/0248907 A1 | 8/2016 | Assem et al. | |
| 2017/0207988 A1* | 7/2017 | Li | H04L 41/5032 |
| 2019/0320063 A1* | 10/2019 | Kollipara | H04L 65/1069 |
| 2020/0014619 A1* | 1/2020 | Shelar | H04L 45/125 |

* cited by examiner

METHOD, SYSTEM, AND DEVICE FOR CLOUD VOICE QUALITY MONITORING

FIELD OF THE INVENTION

The present disclosure generally relates to methods and systems for communication. More particularly, the disclosure relates to monitoring voice quality in a communication system.

BACKGROUND OF THE DISCLOSURE

Voice quality may be a major factor a customer considers when they choose their VoIP system. Other factors may also be considered. For example, in a cloud offering, a call's setup, dial tone, and voice quality during and through the end of the call may all be considered by the customer in selecting or choosing to keep a VoIP system. The customer may have minimum expectations for each step from the call set up to the end of the call. For example, customers expect the dial tone to be heard immediately when they lift a telephone handset to their head in preparation to place a telephone call. When placing such a telephone call, customers expect the telephone call to be connected correctly to their intended destination. Additionally, customers expect the voice quality to be extremely high during the telephone call. For VoIP systems, e.g., in a cloud offering, customers may be extremely sensitive to voice quality issues or other call quality issues and may quickly shift to another vendor in the event of experiencing a telephone call having voice quality issues or other call quality issues. Shifting to another vender may even occur after one telephone call having voice quality issues. Accordingly, systems, methods, and devices for providing VoIP communications with desired voice quality are desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As discussed above, voice quality may be a major factor a customer considers when they choose their VoIP system. Other factors may also be considered. For example, a call's setup, dial tone, and voice quality during and through the end of a communication, such as a telephone call may all be considered by the customer in selecting or choosing to keep a VoIP system. Because a cloud-based VoIP system may allow prompt migration to a new VoIP vendor, unlike a landline telephone offering, voice quality may play an important role in retaining cloud-based VoIP customers. Accordingly, quickly resolving any voice quality problems to avoid customer dis-satisfaction for even a single telephone call may be important. An example embodiment describes how to resolve voice quality issues in a telephone call.

In a cloud-based VoIP offering, voice media may traverse several VoIP appliances. Media may enter from an external network through Session Border Controllers (SBCs) and may traverse through one or more of a trunk switch, conferencing engine, public Internet and telephones depending on the type of call. Voice quality may be affected at any "hop," i.e., a step from one network segment to the next network segment. For example, voice quality may be affected at any hop in a network because of network impediments due to hardware or software problems in appliances through which media travels. Because of the complexity of a cloud-based VoIP system, localizing voice degradation sources may be difficult. Some problems associated with localizing voice degradation sources include determining the type of degradation, determining the cause of the degradation, determining the location of the source of the problem in the cloud, or determining the location of the source of the problem in the network or other locations. To address such a complex problem, solutions for cloud-based VOIP applications are provided by exemplary systems and methods described herein.

Call quality may be monitored for calls that are completed. Once a call quality problem is reported, efforts may be made to reproduce the problem. In practice, however, reproducing a voice quality defect in a controlled environment may not always be feasible or possible. Additionally, after the problem has occurred, the problem may not be reproducible on the same systems because the problem may depend on several states of the appliances and networks in the VoIP system while the problem was occurring. The states of the appliances and networks in the VoIP system may not be the same when trying to reproduce the problem. Furthermore, the states during the problem may not be known. Accordingly, it may be advantageous to analyze problems in a telephone call while the telephone call is in progress, rather than trying to reproduce the problem after the telephone call is complete.

Figure 1:
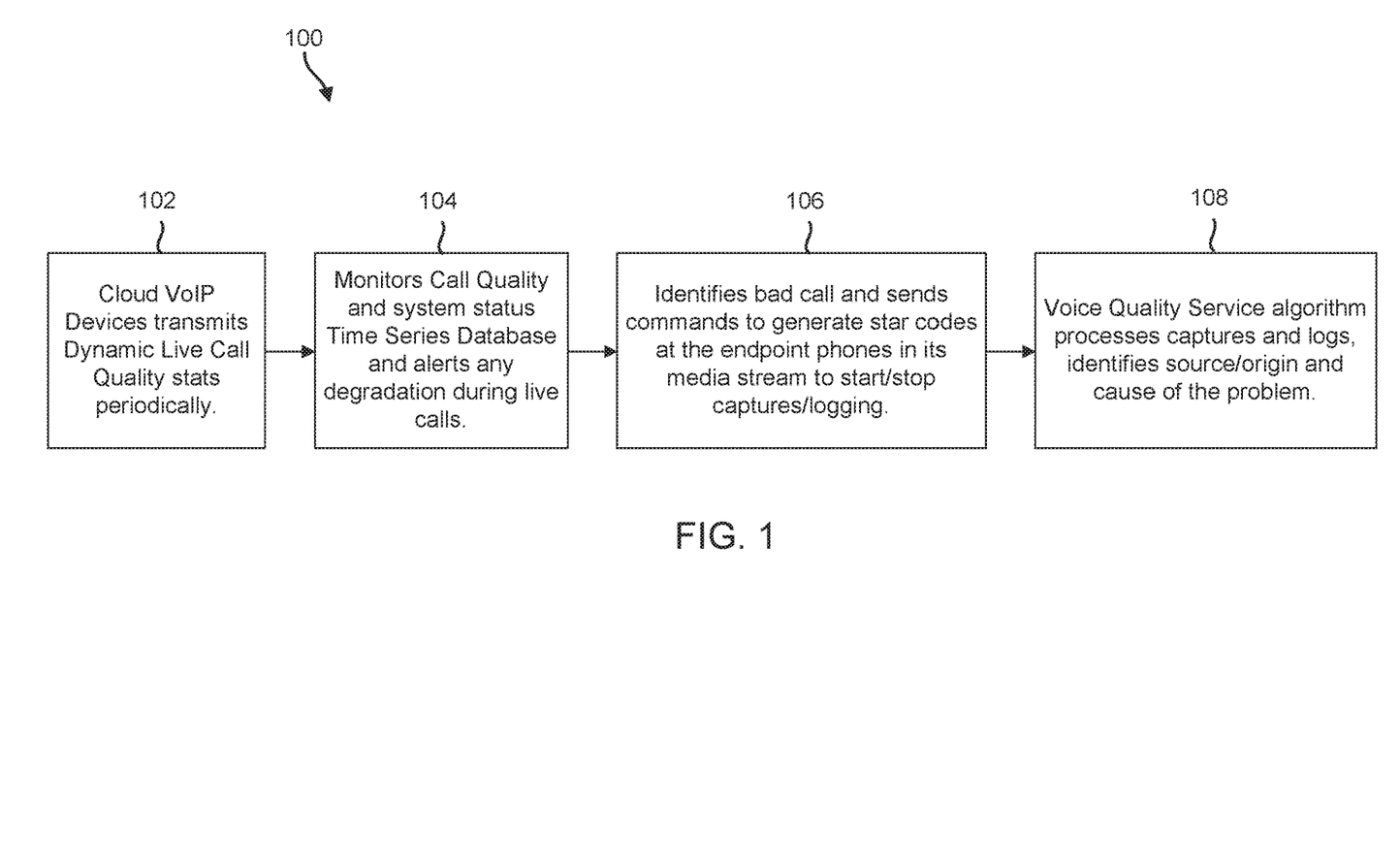
FIG. 1 is a diagram illustrating cloud voice quality monitoring and automatic detection of cause and origin of impairments.

FIG. 1 is a diagram illustrating cloud voice quality monitoring and automatic detection method 100 of cause and origin of impairments. In an example embodiment, a system may capture a problem while the problem is in progress and analyze the problem while the problem is in progress. Capturing and localizing the problem while the problem is in progress may allow the system to localize the root cause of the problem. Accordingly, the problem may be resolved based on a root cause analysis. An example embodiment differentiates from existing solutions, in that the embodiment monitors live active calls looking for voice quality degradations caused by various reasons while the telephone call is in progress.

For example, as illustrated in FIG. 1, a cloud VoIP device may transmit dynamic live telephone call quality statistics periodically 102. A device implementing the systems and methods described herein may monitor telephone call quality and system status in a time series database and alert based on a degradation during live calls 104. Accordingly, a device implementing the systems and methods described herein may identify telephone calls having poor quality. Additionally, a device implementing the systems and methods described herein may send commands to generate star-codes, e.g., at endpoint telephones in the device's media stream, to start captures, stop captures, start logging, stop logging, or some combination of starting captures and logging or stopping captures and logging 106. The voice quality services algorithm may process data captures and logs to identify the source, origin, or cause of a problem 108 causing telephone call quality issues.

Some example embodiments may perform dynamic mean opinion score (MOS) estimates on ongoing active live telephone calls using an example embodiment's instant media statistics periodically during the duration of the call. A MOS estimate may refer to the average measures or rankings of voice, audio, or video quality. Generally, MOS estimates of voice or audio quality within telephone calls will be considered herein. However, it will be understood that the systems and methods described herein may also be applied to video calls and the debugging of problems related to such video calls.

The MOS estimate may give a numerical indication of a perceived telephone call quality. MOS estimates may be expressed as a number, from 1 to 5, with 1 being the worst and 5 being the best. MOS estimates may be quite subjective, however, as MOS estimates may be based on figures that result from people's perceptions. Example MOS values are: 5: Perfect, e.g., like a face-to-face conversation; 4: Fair, e.g., imperfections may be perceived, but sound is still clear. Four may generally be considered the MOS value for a cell phones telephone call, e.g., that is not experiencing problems; 3: Annoying; 2: Very annoying. Nearly impossible to communicate; and 1: Impossible to communicate. MOS estimates need not be whole numbers. Decimal numbers may be used for MOS estimates, e.g., 4.5. While the MOS estimate may give a numerical indication of a perceived telephone call quality as may be perceived by a human listener, software applications may also generate MOS estimates. Some examples software application that may generate MOS estimates are, but may not be limited to: ApparNet Voice, Brix VoIP Measurement Suite, NetAlly, PsyVoIP, and VQmon/EP.

An example embodiment may use advanced time series database administrator applications to monitor and send instant alerts based on ongoing active voice quality degradations. The example embodiment may also automatically identify specific live active calls that have reported voice quality problems and collect more data for these calls from respective appliances. Appliances may post respective data to a voice quality service logging system. Additionally, the example embodiment may use voice quality service to analyze and identify the origin and root cause of the voice quality degradation without any human intervention. In the example embodiment, in the event the voice quality service application cannot identify the problem rapidly, the example embodiment may capture debug information. Debug information may be helpful to developers. For example, the debug information may allow the developers to analyze a telephone call having quality issues to determine the cause of the problem or quality issues. The example embodiment may process telephone call information to narrow down the source of any problem to possible locations or possible appliances causing the problem. Relevant debug information, logs, or both debug information and logs may be available to allow a further inquiry into the problem or problems causing the telephone call quality issue or issues.

An example embodiment may monitor cloud clusters; continuously analyze active calls; periodically compute dynamic MOS scores, e.g., on every telephone call in the cluster; report and/or alert when degradation is below some accepted voice quality threshold; or some combination of these. The example embodiment may quickly debug an impaired telephone call to collect more logs, pulse code modulation (PCM) waveform captures, packet captures, configuration and media statistics including media decryption, or some combination of these. The data may be analyzed rapidly by a voice quality service server to find the root cause or the approximate root cause and to leave the logs to a developer to fix the problem or develop a solution. The monitoring, analyzing, or debugging, or some combination of the monitoring, analyzing, and debugging may be performed while the problem is occurring during a live telephone call. Accordingly, the example embodiment may avoid the expending of efforts to reproduce the problem in a controlled environment of a communications laboratory. Additionally, the example embodiment may exploit cloud applications such as Google Cloud Platform (GCP) or other Cloud applications to perform one or more of the monitoring, analyzing, comparing, or reporting of the systems and methods described herein.

The systems and methods described herein by way of illustrative embodiments. A first example embodiment is a live telephone call monitoring and reporting of alerts system. The system may monitor, and report alerts for telephone calls having poor voice quality below an accepted threshold. A second example embodiment is a live telephone call debugging system where media may be debugged to find a root cause of voice quality degradation in the media path traversing through multiple systems. The two embodiments may be used independently by administrators or in combination. Accordingly, some example embodiments may include live telephone call monitoring and reporting of alerts as well as debugging.

In an example embodiment, for any ongoing conversation on VoIP telephones, when a user experiences poor or bad voice quality, the user may initiate debugging by using a code to indicate to the system that the user is experiencing a VoIP telephone call having poor or bad voice quality. For example, the user may enter a "star-code" on the telephone handset being used, e.g., enter "star," i.e., "*" followed by a number to begin or end debugging. In one example, "*44"

may be the star-code to start debugging and "*55" may be the star-code to stop debugging. Accordingly, administrators may get live debugging data to analyze instead of getting information on the problem after the telephone call is complete. Data from a live telephone call, e.g., while the telephone call is in progress, may be preferable to data from a completed call, which may be referred to as "postmortem data." As discussed above, getting data during a telephone call may, in some cases, result in quickly identifying the source of the problem.

Administrators of the VoIP cloud may initiate the debugging star-codes on the telephone call server HQ without the intervention of speakers or listeners. In an example, a tone may be sent to indicate to the user that a telephone call is under debugging and another tone may be sent to indicate to the user that debugging is completed.

Voice quality degradation alerts may also be sent in email to relevant teams to quickly act upon. In another example, the relevant teams may be sent text messages, e.g., using any of the various texting applications, services, or devices. One example set of applications are the Google applications. Database administrators and real time streaming data processing engine services may also provide statistics on the summary health report of the cloud system and individual appliances over a period such as a day, a week, a month, a year, or any other selected period, including periods less than a day, a week, a month, or a year, or also including longer periods.

As described herein, one example embodiment includes at least one of two functions: (1) cloud voice quality monitoring and alerting on voice quality degradation and (2) debugging the identified media session for which voice quality is identified as degraded.

Figure 2:
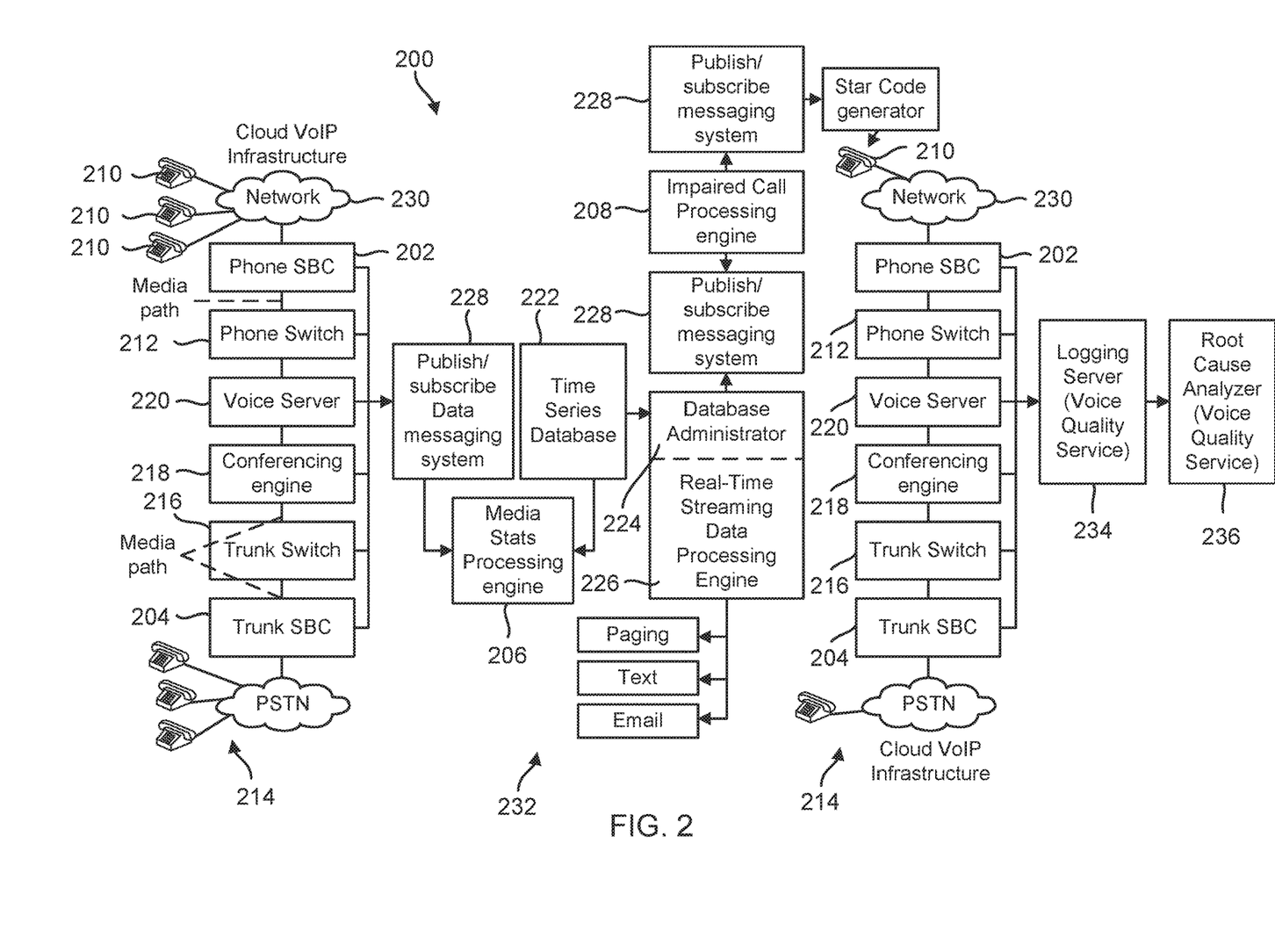
FIG. 2 is a diagram illustrating cloud voice quality monitoring and automatic debugging of impaired live call and root cause analysis.

FIG. 2 is a diagram illustrating a system 200 for cloud voice quality monitoring and automatic debugging of impaired live telephone calls and root cause analysis. In the example embodiment that includes cloud voice quality monitoring and alerting on voice quality degradation, a cloud voice system may include various appliances, including a session border controller (SBC) 202, 204, media statistics processing engine 206, and impaired telephone call processing engine 208.

An SBC 202, 204 may be a device deployed in VoIP networks. The SBC 202, 204 may exert control over the signaling and/or the media streams involved in setting up, conducting, and tearing down telephone calls or other interactive media communications in a VoIP network. Physical telephones 210, e.g., on a network 230, may be hosted on a telephone switch 212. Any external network telephone signaling, or media may come through the SBC 202 and may then reach a respective appliance. Call Setup may be established by a telephone switch 212, which hosts telephones 210. Media may traverse through a trunk SBC 204 from external networks 214 and then to a trunk switch 216. Further, media may reach a conferencing engine 218 when the system is used for a conference call. Media may also originate from a voice server 220, e.g., a voice mail server, or a trunk switch, or a telephone switch. SBCs 202, 204 may interface with telephones 210 and external networks 214. Aspects of the systems and methods described herein may mainly be focused on media stream paths.

Figure 3:
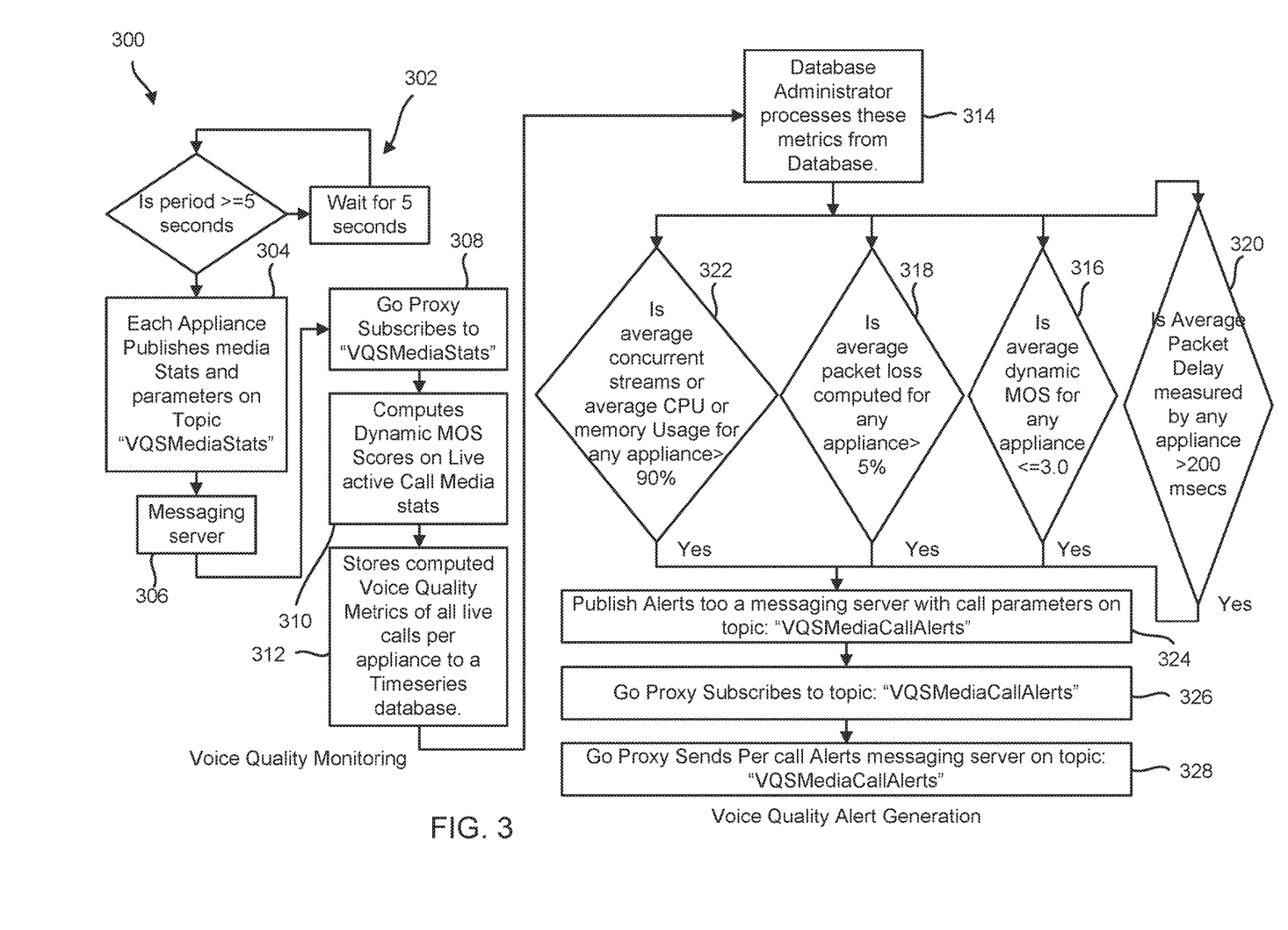
FIG. 3 is a diagram illustrating live voice quality monitoring and alerting.

FIG. 3 is a diagram illustrating a method 200 for live voice quality monitoring and alerting. Referring now to FIG. 3, in conjunction with FIG. 2, the live active media streams from different appliances may be monitored. The appliances monitored may include SBCs 202, 204 (e.g., SBCs may include real-time transport protocol (RTP) engines). In an example, monitoring of appliances may occur every five seconds 302. Each appliance may send the appliance's active calls configuration parameters and media statistics to a device implementing the systems and methods described herein. Each appliance may publish the appliance's media statistics on active live telephone calls and each telephone call's parameters to identify the calls to a topic 304, such as "VQSMediaStats." Various data messaging systems may be used 306. Examples of data messaging systems 306 include, but are not limited to Apache Kafka, Google Cloud Pub/Sub, and Amazon Kinesis.

A media statistics processing engine 206 may subscribe 308 to the media statistics, e.g., "VQSMediaStats" and may receive media statistics for live calls from each appliance in a media path for all the active calls in the cloud at that time. The media statistics processing engine 206 may collect network impairments like packet loss, delay, jitter, signal level codec, round trip delay, or other network problems. The media statistics processing engine 206 may compute a dynamic MOS score 310. In an example, the MOS score may be based on the ITU-T E-Model algorithm or other MOS score algorithm. Throughout a call, the MOS score may be computed periodically, e.g., every 5 seconds 302. In addition to media metrics; the CPU usage, memory usage, current concurrent media streams, and other instant status information may also be captured. The collected data may be stored 312 in a time series database 222. An example of a time series database 222 includes but is not limited to InfluxDB.

A database administrator 224 may get the data and analysis for processing 314. One example of such an administrator is Chronograf, which is an open source web application for visualizing data. A real time streaming data processing engine 226 may be used to analyze the media statistics along with newly computed values like dynamic MOS scores to monitor the voice quality along with system usage in each appliance. The processing engines 226 may monitor the metrics. Whenever the processing engines 226 cross a set of respective thresholds parameter-wise, respective alert types are generated, e.g., by paging, texting, email, or some combination of paging, texting, and email 232. The alerts may be generated per call, per appliance, per tenant, per cluster, or for an entire cloud system, or for combinations of one or more of per call, per appliance, per tenant, per cluster, or for the entire cloud system. An example of a time series data processing engine is the Kapacitor application. (Kapacitor is an application designed to process streaming data in real-time.)

Currently the parameters used to define bad voice quality may include MOS, packet delay, packet loss, packet jitter, signal level, and other parameters indicative of poor voice quality. The parameters used to define bad voice quality may be statistically averaged over each tenant, over each appliance, over an entire cloud, only for SBCs, for a set of calls on specific devices, only on a conference call, only on trunk calls, or for other types or sets of calls, or for some combination of these. An administrator may select the conditions. The configuration may be available per telephone call for media statistics/parameters received. Additionally, classification may be left to the administrator.

As an example, when an average MOS value on any appliance reported is less than, e.g., 3.0 (316), when an average packet loss reported is greater than, e.g., 5% (318), or when average packet delay is greater than, e.g., 200 milliseconds (320), when average concurrent media streams on any appliance is greater than, e.g., 90% of the appliance's capacity (322), when average CPU usage exceeds 90% of CPU capacity (322), or when average memory usage exceeds 90% of available memory on respective appliance (322) an alert may be published 324.

An impaired telephone call processing engine 208 may allow a database administrator 224 to publish 228, 324 alert messages to a data messaging server (e.g., using Kafka and/or Google Pub/Sub). For example, alerts from "VQSMediaAlerts" may be published. The alerts may be subscribed to 326. In an example, the alerts may be subscribed to on a per call basis 328. The alerts may include topics such as call parameters and call statistics. In an example, the message sent in the alerts may refer to the appliance on which bad quality is reported, the tenant on which bad quality is reported, or the entire cloud could report bad quality. In an example, the service may publish individual call alerts on the "VQSMediaCallAlerts" topic. The alerts may include calls reporting bad quality within the appliance. Call specific parameters including Call globally unique identifier (GUID), Extension, telephone type, Source/destination IP addresses, ports, or other call specific parameters may be sent using the "VQSMediaCallAlerts" which may be a publish message.

As discussed above, a device implementing the systems and methods described herein may start or stop captures and/or logging, e.g., to a capture or logging server 234. The voice quality services algorithm may include a root cause analyzer 236 to process data captures and logs to identify the source, origin, or cause of a problem 108, e.g., the root cause of the problem.

As described above, a device implementing the systems and methods described herein may identify bad or poor calls and send commands to generate star-codes at the endpoint telephones in the device's media stream to start or stop captures and/or logging 106. For example, a star-code generator 238 may send commands to generate star-codes at the endpoint telephones in the device's media stream to start or stop captures, as described in greater detail below.

Figure 4:
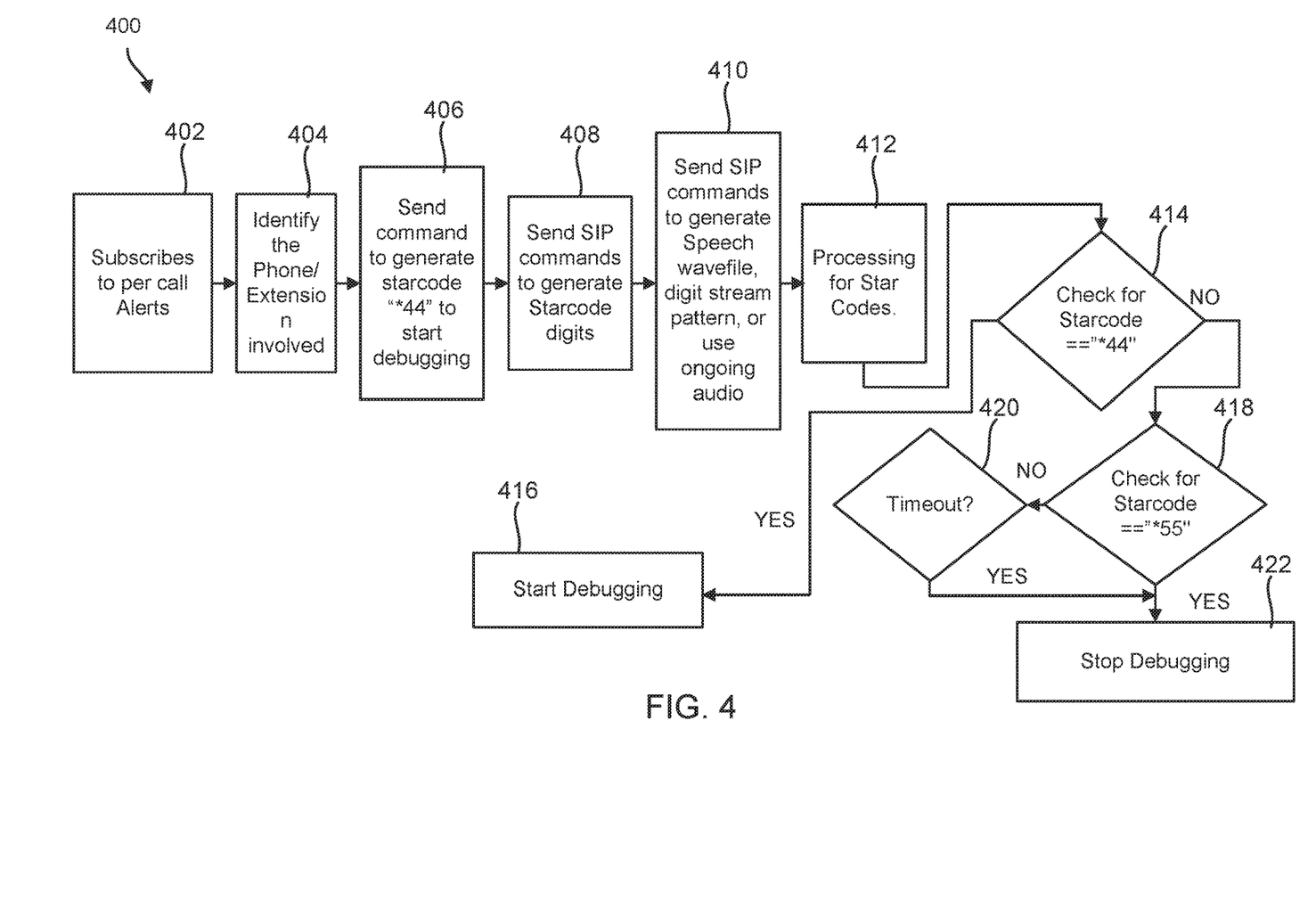
FIG. 4 is a diagram illustrating live voice quality debugging captures.

FIG. 4 is a diagram illustrating a method 400 for live voice quality debugging captures. In an example embodiment, the star-code generator 238 (or other component) may subscribe to alerts 402, e.g., "VQSMediaCallAlerts" from the data messaging server, using, e.g., Kafka, Google Pub/Sub, or another stream-processing software platform. The call server service may identify the telephone/extension that may be involved in the bad call 404. The call server service may send a command to generate a star-code ("*44") digits to the physical or soft telephone 406. The feature may be available in the IP telephones used in VoIP. The call server may use SIP or gRPC (Remote Procedure Call) to send commands to generate star-codes 408. Additionally, the call server may use SIP or gRPC to send a predefined speech wave file, a digital stream pattern, or use an ongoing audio conversation 410. For example, the call server may use SIP or gRPC to dual-tone multiple-frequency (DTMF) to generate commands to a telephone. The DTMF command may be star-codes. Accordingly, each appliance that receives the media stream may process star-codes (412).

The commands generally cannot be sent to the telephone directly. The telephone switch may include an interface to a telephone device through the SIP signaling protocol. The telephone switch may send DTMF generated digits to send commands to the telephone. Feature Access Star-codes may be special sequences of characters that users dial from a telephone keypad to invoke features. For example, a user might press *6, followed by 2023 to forward all incoming calls to extension 2023. The codes may be customizable. Additionally, new codes may be added for new functions.

Once a telephone generates DTMF digits, e.g., in RFC2833 form (RFC2833 may be the mechanism used to send DTMF digits for in-band RTP), the RTP packets may traverse an entire media path and reach the destination. There could be several appliances in the media path. For a trunk call, external trunk media may reach the trunk SBC first, then the external trunk data may go to the trunk switch, followed by the telephone SBC and then the local extension/telephone. When the telephone generates these digits indicating start debug 416, then the telephone may trigger all the appliances to start debugging 416. Apart from trunk switches, telephone switches, voice servers, and conferencing engines, SBCs may also have RTP Engines which may process media. The RTP engines may also be provisioned to process the star-codes and send desired information as may be done on the switches.

When star-code "*44" is received 414, the star-code may cause a trigger to start debugging on each appliance through which media traverses for a specific active call 416. Accordingly, each appliance may enhance debug levels so that more debugging logs are available for developer to process. Each appliance may start capturing linear decoded waveforms inside the media engine. Linear decided waveforms may be captured into a file to transmit. Each appliance may start Ethernet packet capture on the interface to collect specific relevant media stream packets controlled with source and destination IP Addresses and ports. Each appliance may also capture some required parameters like source and destination IP addresses, ports, SRTP public/private keys for SRTP decryption, codec parameters for decoding the ethernet packet captures, or a combination of these. On each appliance in the media path, the CPU may start monitoring the usage of each appliance and the memory usage of each appliance. The usage of each appliance and the memory usage of each appliance may be logged for analysis.

The administrator may configure the choice of speech waveform to be sourced during this state of debugging (e.g., after *44 star-code is applied). In option 1, ongoing speech conversation is used to analyze the voice quality. In option 2, several ITU speech quality measurements may be taken. The measurement may be given a reference to speech wave files, the wave files may be sent during this state or any specific text-to-speech wave file may be sent. In option 3, a pattern of digits may be sent during this state. Additionally, this may help to validate at each hop besides passive analysis.

The call server HQ can send "*55" to stop the debugging command to the telephone switch and then to the telephone, or there can be an internal timeout on each appliance to stop debugging after a predetermined period, e.g., 120 seconds, or any period between 0 and 120 seconds, or more. Once the appliances receive stop debugging star-code "*55" (418) or timeout (420) the following steps (422) may be executed on each appliance to stop debugging.

When stopping debugging, based on the mode selected, when a known digit stream pattern is being sent, then appliances may stop sending the digits of the known digit stream pattern being sent. Similarly, when stopping debugging, when a known speech waveform is being sent, then appliances may stop sending the known speech waveform. When no selection of stopping the known digit stream or stopping the known speech waveform are made, then there may be no actions to take related to debugging as the ongoing conversation keeps running other than ending the debugging. Accordingly, each appliance may reset debug levels. Each appliance may also stop capturing linear decoded waveforms inside the media engine and complete writing the acquired waveforms to a file. Additionally, each appliance may stop Ethernet packet capture and complete writing to the file. Each appliance may also collect one or more of the debug media/call control logs, waveform files, packet captures, and parameters, and send the one or more of the debug media/call control logs, waveform files, packet captures, and parameters to the logging server. The data sent may have a main header that is a JavaScript Object Notation (JSON) metadata file. The data may include files and a call to a Globally Unique Identifier (GUID) identification to identify a specific media stream received from each hop in the VQS engine. When any programmed wave file or digit stream is sent during this state, then this may be disabled at the termination of debugging.

Figure 5:
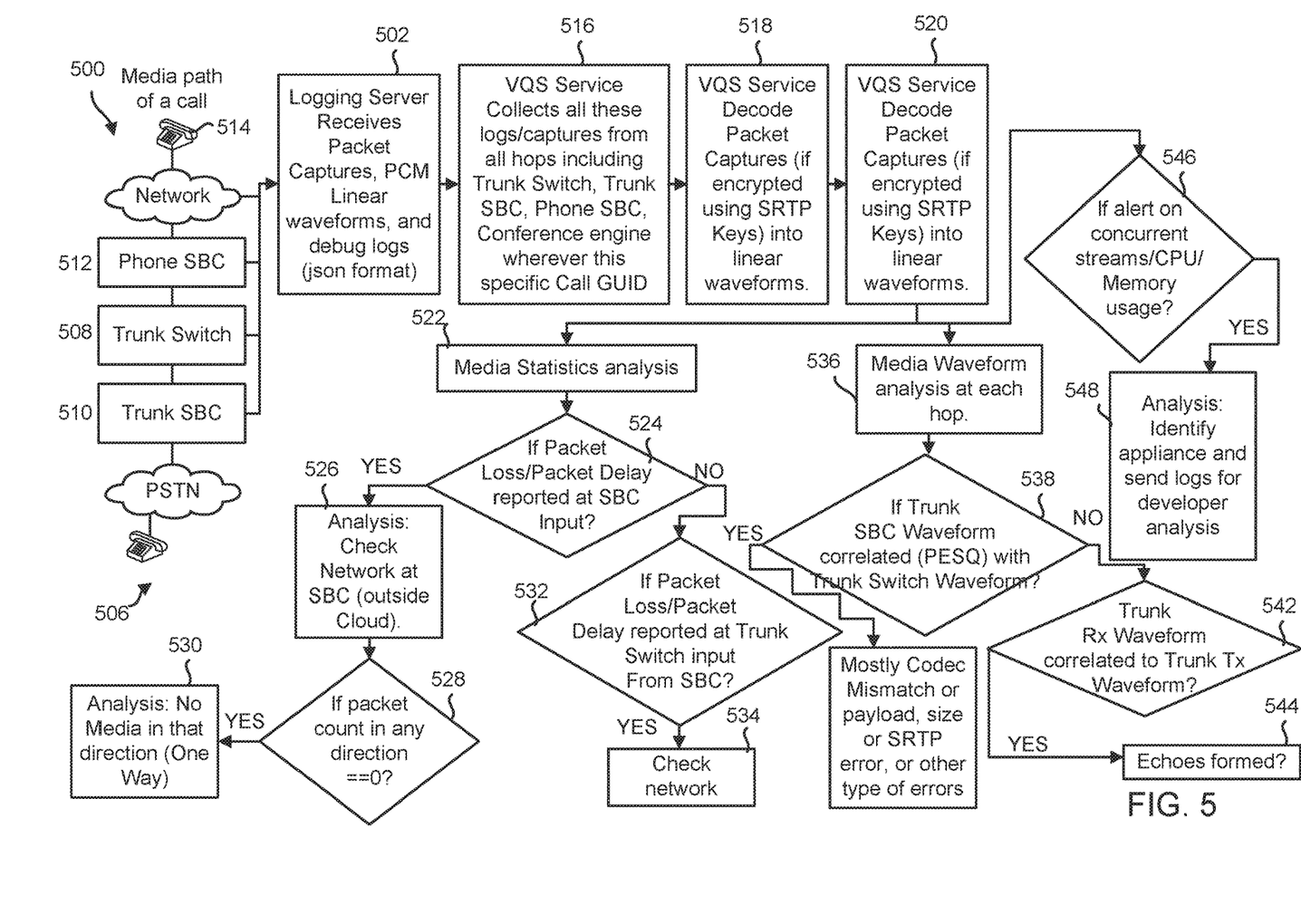
FIG. 5 is a diagram illustrating a voice quality service (VQS) analyzer.

FIG. 5 is a diagram illustrating a voice quality service (VQS) analyzer 500. The VQS analyzer 500 may perform a live voice quality debugging capture analysis. The VQS analyzer 500 may include a logging server. The logging server may be connected to media path 504. The media path 504 may couple the logging server to various appliances and devices 506. The appliances may send their respective data for a specific media stream identified by the appliance's call GUID in respective header meta JSON file. Accordingly, the logging server may receive packet captures, PCM Linear waveforms, and debug logs (e.g., in the JSON format) 502.

A VQS Service engine may run on a logging server. The VQS Service engine, e.g., running on the logging server, may process the above data to analyze and conclude automatically. The analysis may use Secure Real-time Transport Protocol (SRTP) decryption, speech decoders (e.g., G.729, iLBC, G711, G722, or other speech decoders), the PESQ algorithm using two waveforms, or some combination of these. The analysis using SRTP decryption, speech decoders, or the PESQ algorithm may result in an MOS Score. Accordingly, the VQS Service may collect the logs/captures from one or more "hops" in a media path for a call, including, but not limited to a trunk switch 508, trunk SBC 510, phone SBC 512, and/or conference engine 514 having a specific Call GUM 516.

The VQS service may decrypt and decode the packet captures 518, 520. The VQS service may prepare the waveforms (linear), e.g., in WAV file format. PESQ is an algorithm which may pick up any two waveforms and when these waveforms are the same or similar, e.g., correlated in some way, then the correlation may result in an MOS score of 5.0. A MOS score of 5.0 may indicate a one to one match of the two waveforms. A MOS score in the range of 0 to 5.0 may be used as a voice quality index. The voice quality index may be used to match the waveforms.

For a media stream flowing from an SBC to a local extension, waveforms may be compared at each hop to a next hop in one direction. Accordingly, the above correlation MOS score may reflect how close or how degraded the waveforms are to each other on each hop. When a MOS Score is degraded then an analysis may conclude that, at that specific hop, a call quality issue has occurred. For example, call quality issues may have occurred due to some mismatch occurring, an SRTP error, packet decoding, noise, delays, or other call quality issues.

When transmitted waveforms and received waveforms at any hop are correlated, the correlation may indicate that there is an echo. Similarly, more analysis may be added to these algorithms. Based on media stream signal levels, one-way audio or no-way audio may be detected. Packet loss/delay/jitter statistics at each hop may show how good the network is at that hop. When any bad statistics are observed, the hop having the bad statistics observed may be declared bad source.

Media statistics analysis 522 may include determining when packet loss or packet delay is reported at the SBC input 524. When a packet loss or a packet delay is reported at an SBC input, an analysis may be performed to check the network at the SBC outside cloud) 226. When the packet count in any direction is equal to 0 (228), there is no media in that direction (e.g., one way) 230. When packet a loss or packet delay is reported at the trunk switch input from SBC 532, the network within the cloud may be checked 534.

Media statistics analysis 522 may include media waveform analysis 536 at each hop. When the trunk SBC waveform is correlated (PESQ) with trunk switch waveform 538, generally, the issues may be mostly a codec mismatch or a payload, size or SRTP error, or other type of errors 540. When the trunk SBC waveform is not correlated (PESQ) with trunk switch waveform 538 and when the trunk Rx waveform is correlated (PESQ) to the trunk Tx waveform 542, echoes may be formed 544. When an alert is on concurrent streams/CPU/Memory usage 546, identify appliance and send logs for developer analysis 548.

Figure 6:
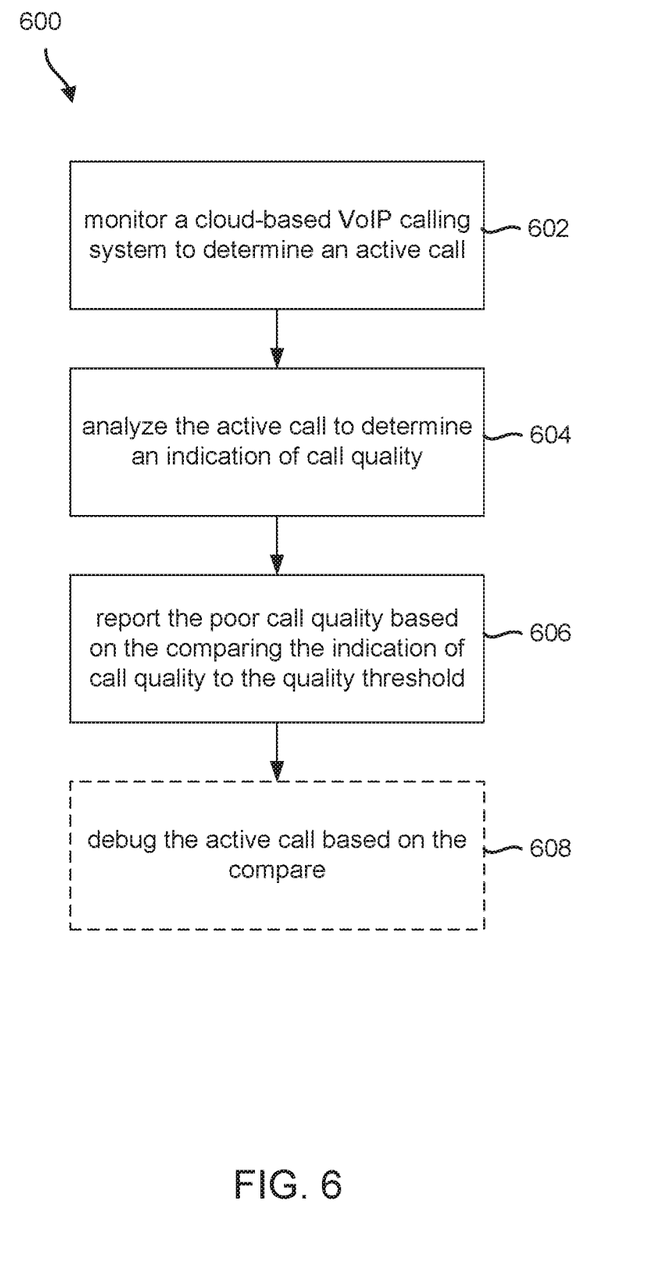
FIG. 6 is a flow diagram illustrating an example method.

FIG. 6 is a flow diagram illustrating an example method 600 in accordance with the systems and methods described herein. A device or devices implementing the systems and methods described herein may monitor a cloud-based VoIP calling system to determine an active call (602). The device or devices may also analyze the active call to determine an indication of call quality, the analyzing occurring during the active call (604). Additionally, the device or devices may compare the indication of call quality to a quality threshold (606). The device or devices may also report the poor call quality based on the comparing the indication of call quality to the quality threshold (608). The device or devices may optionally, debug the active call based on the compare (610).

As discussed above, a device or devices implementing the systems and methods described herein may monitor a cloud-based voice over internet protocol (VoIP) calling system to determine an active call (602). The device or devices may also analyze the active call to determine an indication of call quality, the analyzing occurring during the active call (604). The indication of call quality includes at least one of mean opinion score (MOS), packet loss, packet delay, concurrent media streams being used, CPU usage, and memory usage. The indication of call quality may include an average of at least one of mean opinion score (MOS), packet loss, packet delay, concurrent media streams being used, CPU usage, and memory usage. Analyzing the active call to determine the indication of call quality may include monitoring for a user input indicating the poor call quality. In another example embodiment, analyzing the active call to determine the indication of call quality may include monitoring for an administrator input indicating the poor call quality.

Additionally, the device or devices may compare the indication of call quality to a quality threshold 606. The comparing may occur during the active call to determine when the active call has a poor call quality.

The device or devices may also report the poor call quality based on comparing the indication of call quality to the quality threshold 608. Reporting the poor call quality may occur when at least one of an average MOS value on a device routing the active call is less than 3.0, an average packet loss reported is less than 5%, an average packet delay is greater than 200 milliseconds, an average number of concurrent media streams on the device routing the active call is greater than 90% of the device's capacity, an average CPU usage exceeds a predetermined percentage of CPU capacity, and an average memory usage exceeds a predetermined percentage of available memory on the device routing the active call.

The device or devices may optionally, debug the active call based on the compare (610). The debugging may occur during the active call and may provide at least one of a determination of a source of the poor quality or debugging information for post-call analysis. A first identifier may be used to signal a beginning of debugging and a second identifier may be used to signal an ending of debugging. Debugging the active call may further include at least one of: (1) collecting a call log, (2) capturing a call signal waveform, (3) capturing a call data packet, (4) collecting configuration and media statistics. Analyzing the at least one of the call logs, the call signal waveforms, the call data packets, and the configuration and media statistics may occur during an active call. The analysis may include comparing at least one of the call logs, the call signal waveforms, the call data packet, and the configuration and media statistics to the quality threshold.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand-alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed:

1. A communication method comprising:
   monitoring a cloud-based voice over internet protocol (VoIP) calling system to determine an active call;
   analyzing the active call to determine an indication of call quality, the analyzing occurring during the active call;
   comparing the indication of call quality to a quality threshold, the comparing occurring during the active call to determine when the active call has a poor call quality;
   reporting the poor call quality based on the comparing the indication of call quality to the quality threshold;
   publishing an alert indicating the poor call quality to a data messaging server;
   the data messaging server subscribing to the alert on a per call basis;
   based on the reporting, start logging information on a logging server; and
   using a telephone, triggering an appliance to begin debugging the active call based on the compare, the debugging occurring during the active call and providing at least one of a determination of a source of the poor quality or debugging information for post-call analysis, wherein the appliance debugs the active call based on the compare and wherein a first identifier is used by the appliance to signal a beginning of debugging and a second identifier is by the appliance used to signal an ending of debugging.

2. The communication method of claim 1, wherein debugging the active call further comprises at least one of: (1) collecting a call log, (2) capturing a call signal waveform, (3) capturing a call data packet, (4) collecting configuration and media statistics; and wherein analyzing the at least one of the call log, the call signal waveform, the call data packet, and the configuration and media statistics occurs during the active call and includes comparing at least one of the call log, the call signal waveform, the call data packet, and the configuration and media statistics to the quality threshold.

3. The communication method of claim 1, wherein the indication of call quality comprises at least one of mean opinion score (MOS), packet loss, packet delay, concurrent media streams being used, CPU usage, and memory usage.

4. The communication method of claim 3, wherein the indication of call quality comprises an average of at least one of mean opinion score (MOS), packet loss, packet delay, concurrent media streams being used, and CPU usage, memory usage.

5. The communication method of claim 3, wherein the reporting the poor call quality occurs when at least one of an average MOS value on a device routing the active call is less than 3.0, an average packet loss reported is less than 5%, an average packet delay is greater than 200 milliseconds, an average number of concurrent media streams on the device routing the active call is greater than 90% of its capacity, an average CPU usage exceeds a predetermined percentage of CPU capacity, and an average memory usage exceeds a predetermined percentage of available memory on the device routing the active call.

6. The communication method of claim 1, wherein analyzing the active call to determine the indication of call quality includes monitoring for a user input on a user device, the user input indicating the poor call quality.

7. The communication method of claim 1, wherein analyzing the active call to determine the indication of call quality includes monitoring for an administrator input indicating the poor call quality.

8. A communication device, comprising:
   a processor; and
   a tangible, non-transitory memory configured to communicate with the processor, the tangible, non-transitory memory having instructions stored thereon that, in response to execution by the processor, cause the processor to perform operations comprising:
   monitoring a cloud-based voice over internet protocol (VoIP) calling system to determine an active call,
   analyzing the active call to determine an indication of call quality, the analyzing occurring during the active call,
   comparing the indication of call quality to a quality threshold, the comparing occurring during the active call to determine when a call has a poor call quality,
   reporting the poor call quality based on the comparing the indication of call quality to the quality threshold,
   publishing an alert indicating the poor call quality to a data messaging server,
   the data messaging server subscribing to the alert on a per call bases,
   based on the reporting, start logging information on a logging server, and
   debugging the active call based on the compare, the debugging occurring during the active call and providing at least one of a determination of a source of the poor quality or providing debugging information for post-call analysis, and
   wherein a first identifier is used by the device or the devices to signal a beginning of debugging and a second identifier is used by the device or the devices to signal an ending of debugging.

9. The communication device of claim 8, wherein debugging further comprises at least one of: (1) collecting a call log, (2) capturing a call signal waveform, (3) capturing a call data packet, (4) collecting configuration and media statistics; and wherein analyzing the at least one of the call log, the call signal waveform, the call data packet, and the configuration and media statistics occurs during the active call and includes comparing at least one of the call log, the call signal waveform, the call data packet, and the configuration and media statistics to the quality threshold.

10. The communication device of claim 8, wherein the indication of call quality comprises at least one of mean opinion score (MOS), packet loss, packet delay, concurrent media streams being used, CPU usage, and memory usage.

11. The communication device of claim 10, wherein the indication of call quality comprises an average of at least one of mean opinion score (MOS), packet loss, packet delay, concurrent media streams being used, and CPU usage, memory usage.

12. The communication device of claim 10, wherein the reporting the poor call quality occurs when at least one of an average MOS value on a device routing the active call is less than 3.0, an average packet loss reported is less than 5%, an average packet delay is greater than 200 milliseconds, an average number of concurrent media streams on the device routing the active call is greater than 90% of its capacity, an average CPU usage exceeds a predetermined percentage of CPU capacity, and an average memory usage exceeds a predetermined percentage of available memory on the device routing the active call.

13. The communication device of claim 8, wherein analyzing the active call to determine the indication of call quality includes monitoring for a user input indicating the poor call quality.

14. The communication device of claim 8, wherein analyzing the active call to determine the indication of call quality includes monitoring for an administrator input indicating the poor call quality.

15. A communication system, comprising:
   a first communication device;
   a second communication device; and
   a server configured to:
      monitor a cloud-based voice over internet protocol (VoIP) calling system to determine an active call between the first communication device and the second communication device;
      analyze the active call to determine an indication of call quality, the analyzing occurring during the active call;
      compare the indication of call quality to a quality threshold, the comparing occurring during the active call to determine when the active call has a poor call quality;
      report the poor call quality based on the comparing the indication of call quality to the quality threshold;
      send an alert of the poor quality via one or more or paging, texting, and email to a subscriber, and
      debug the active call based on the compare, the debugging occurring during the active call and providing at least one of a determination of a source of the poor quality or providing debugging information for post-call analysis,
   wherein the first communication device sends a command to start logging on a logging system, and
   wherein a first identifier is used by the server to signal a beginning of debugging and a second identifier is used by the server to signal an ending of debugging.

16. The communication system of claim 15, wherein debugging the active call further comprises at least one of: (1) collecting a call log, (2) capturing a call signal waveform, (3) capturing a call data packet, (4) collecting configuration and media statistics; and wherein analyzing the at least one of the call log, the call signal waveform, the call data packet, and the configuration and media statistics occur during the active call and includes comparing at least one of the call log, the call signal waveform, the call data packet, and the configuration and media statistics to the quality threshold.

17. The communication system of claim 15, wherein the indication of call quality comprises at least one of mean opinion score (MOS), packet loss, packet delay, concurrent media streams being used, CPU usage, and memory usage.

* * * * *